United States Patent [19]
Leibowitz

[11] 3,735,271
[45] May 22, 1973

[54] PULSE WIDTH CODED SIGNAL DETECTOR

[75] Inventor: Lawrence M. Leibowitz, Fairfax, Va.

[73] Assignee: The United States of America as represented by the Secretary of the Navy, Washington, D.C.

[22] Filed: Oct. 22, 1971

[21] Appl. No.: 191,698

[52] U.S. Cl. ................328/112, 307/234, 328/110
[51] Int. Cl. ...........................................H03k 5/18
[58] Field of Search.....................328/110, 111, 112, 328/207; 307/215, 234, 273

[56] References Cited

UNITED STATES PATENTS

| | | | |
|---|---|---|---|
| 2,648,766 | 8/1953 | Eberhard | 328/112 |
| 3,020,483 | 2/1962 | Losee | 328/112 X |
| 3,146,432 | 8/1964 | Johnson | 307/273 X |
| 3,202,834 | 8/1965 | Pingry et al | 307/273 X |
| 3,473,115 | 10/1969 | Oliver | 328/112 X |
| 3,500,069 | 3/1970 | Johns | 328/111 X |
| 3,544,910 | 12/1970 | Ralphs | 307/273 X |

OTHER PUBLICATIONS

Pataki, "Multivibrators Separate Pulses According to their Widths," Electronics, Dec. 8, 1969 [at 88]

Primary Examiner—John W. Huckert
Assistant Examiner—L. N. Anagnos
Attorney—R. S. Sciascia, Arthur L. Branning and Philip Schneider

[57] ABSTRACT

Two one-shot circuits are triggered by an input data pulse to be interrogated. At the leading edge of the input pulse, one of the two one-shot circuits generates a pulse of the specified width minus the specified tolerance. The other one-shot circuit generates a pulse width equal to the specified tolerance at the trailing edge of the interrogated pulse. The output of the first one-shot circuit triggers a third one-shot circuit which in turn generates a pulse of a width equal to twice the specified tolerance. The outputs of the second and third one-shot circuits are combined in a NAND gate which generates the detection pulse to indicate that the interrogated pulse is within the specified tolerance. The detection pulse is generated as soon as the trailing edge of the interrogated pulse is received. Thus, two input data pulses can be placed as close together as possible as long as the individual pulse identity is maintained, making it possible to maximize the date rate. A multiplicty of detector circuits may be connected in a parallel manner, each generating a detection pulse upon the reception of a pulse specified length, thus permitting the decoding of an entire pulse-width-coded message.

3 Claims, 4 Drawing Figures

INVENTOR.
LAWRENCE M. LEIBOWITZ

INVENTOR.
LAWRENCE M. LEIBOWITZ

PULSE WIDTH CODED SIGNAL DETECTOR

BACKGROUND OF THE INVENTION

This invention contemplates a simple falling within of detecting a pulse of a particular length T fallingwithin a specific tolerance $\pm \Delta t$. As is well known in the art, most pulse width detection circuits employ two one-shot circuits. Both one-shot circuits are triggered on the leading edge of an interrogated pulse, and each generates a pulse of a particular length. The first one-shot circuit generates a pulse width of $T - \Delta t$ and the other generates a pulse width of $T + \Delta t$. Each of these two pulses are then compared with the interrogated pulse. If the interrogated pulse is not of a width equal to $T \pm \Delta t$, no detection pulse will result. These circuits function on the principle that the interrogated pulse may be present at the trailing edge of either the $T - \Delta t$ or the $T + \Delta t$ pulse but will not be present at the trailing edge of both pulses.

However, if an interrogated pulse does fall within the specified tolerance, a detection pulse will be generated but not until a time equal to or greater than $T + \Delta t$. As can be easily seen, the detection of many pulses produces the accumulation of a significant number of unwanted time intervals between the trailing edge of the interrogated pulse and the leading edge of the resulting detection pulse. Thus the data input rate does not proceed as fast as possible.

Considering the drawbacks of the prior art, I have developed a circuit capable of determining the pulse width, within any given tolerance, upon the detection of the trailing edge of the input interrogated pulse. The use of this circuit, therefore, increases the data rate since the system does not have to wait a length of time after the reception of an interrogated pulse which can be as much as $\Delta t$, to decide whether or not the interrogated pulse if of the required length. Furthermore, as long as two consecutive interrogated pulses can be distinguished from each other, they may be placed as close together as possible to permit maximum data rates.

SUMMARY OF THE INVENTION

This circuit accepts an interrogated pulse of an unknown width. After receiving the interrogated pulse it determines whether or not the pulse is of a particular width plus or minus a specific tolerance. If the width of the interrogated pulse corresponds to the particular length, a detection pulse is generated.

The operation of this circuit comprises three important steps. The first step is to generate a pulse of minimum acceptable width upon immediate reception of the interrogated pulse. The pulse of minimum acceptable width provides a foundation for determining whether or not the interrogated pulse is of the particular length plus or minus the specific tolerance. The second step consists of generating a "window" of a width equal to twice the acceptable tolerance, starting at end of the pulse of minimum acceptable width. If the interrogated pulse ends within the time that the "window" appears its length is equal to the particular length of the interrogated pulse plus or minus the tolerance. Thus, in the third step, a pulse at the end of the interrogated pulse is generated and a coincidence test is made to ascertain whether or not the interrogated pulse ends within the window. If it does, a detection pulse is generated.

OBJECTS OF THE INVENTION

An object of this invention is to provide a simple means to accurately detect a pulse of a specified length.

Another object is to provide a circuit capable of detecting a pulse of specified length within a selectable pre-set tolerance.

Another object of the present invention is to provide a multiplicity of detectors, each capable of detecting different individual pulse widths.

Other objects of this invention will become apparent to those skilled in the art after an understanding of this specification taken in conjunction with the following drawing in which like parts are similarly labled throughout.

DRAWINGS

DETAILED DESCRIPTION

Figure 1:
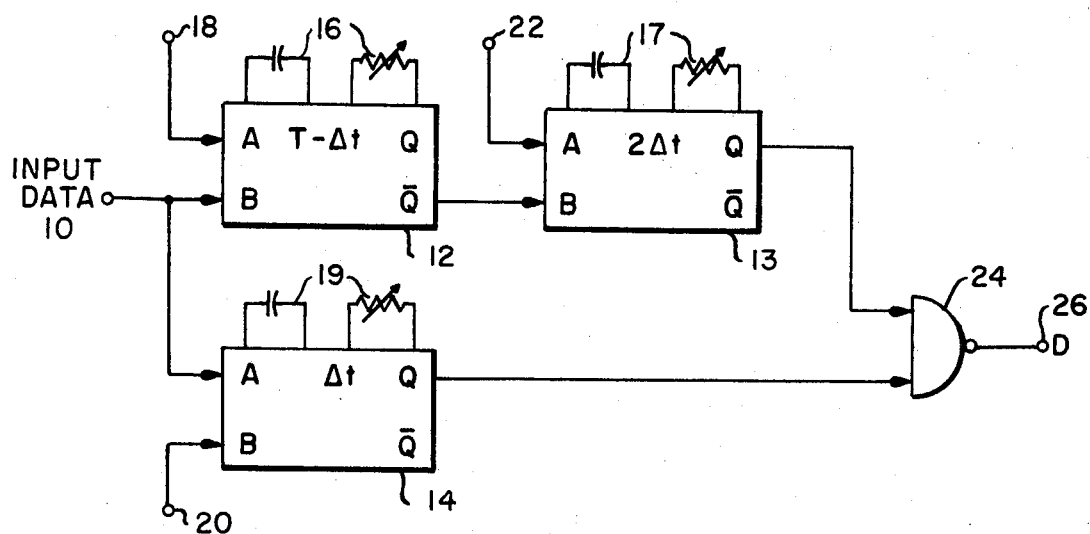
FIG. 1 is a schematic diagram of logic circuitry capable of detecting a pulse of width T within a tolerance of $\pm \Delta t$.

Referring to FIG. 1, data input 10 is applied to one-shot circuits 12 and 14. Typically the data is in the form of fixed-amplitude pulses whose width varies in accordance with the information to be transmitted. Each pulse represents a particular bit of information and upon sequential detection of all the particular bits, a message may be obtained. For purposes of example, assume many pulses of various pulse width appear at input 10, and a pulse of width T, falling within a particular tolerance $\pm \Delta t$, is to be detected.

One-shot circuits 12, 13 and 14, as shown, are of the TTL 54/74121 type. Although the selection or circuitry of any particular one-shot is not critical, the overall one-shot circuit must display the following characteristics: With input A of the one-shot circuits at a logical "0" level, a one-shot pulse of a pre-set length is triggered by a positive-going pulse at input B. Similarly, with a logical "1" level applied to B, a one-shot pulse is triggered by a negative-going pulse at input A. For purposes of this invention, input A of one-shot circuits 12 and 13 are set to a logical "0" through leads 18 and 22, respectively; thus permitting each of them to be triggered on a positive-going pulse at their respective B input. Input B of one-shot circuit 14 however is set at logical "1" to provide a one-shot pulse on a negative-going pulse at its input A.

Each one-shot circuit 12, 13 and 14 is provided with its respective variable resistor and capacitor arrangement 16, 17, 19 to accurately adjust the length of the pulse on output Q or $\bar{Q}$.

One-shot circuit 12 is required to produce a pulse length of $T - \Delta t$ where T is the length (usually in micro sec) of the pulse to be detected and $\Delta t$ is the tolerance (usually in nano seconds) by which T is allowed to vary. Thus by selecting the proper combination of resistor-capacitor 16, the output $\bar{Q}$ will remain at a logical "1" until a positive-going pulse is received at input B.

When such a pulse is received, output $\overline{Q}$ will go to a logical "0" for a length of time equal to $T - \Delta t$.

Similarly, resistor-capacitor arrangement 17 and 19 can be respectively set to provide pulses of length $2\Delta t$ and $\Delta t$. The Q outputs of one-shot circuits 13 and 14 are applied to NAND gate 24 which provides an output when a pulse of $T \pm \Delta t$ width is provided at the input 10.

Figure 2:
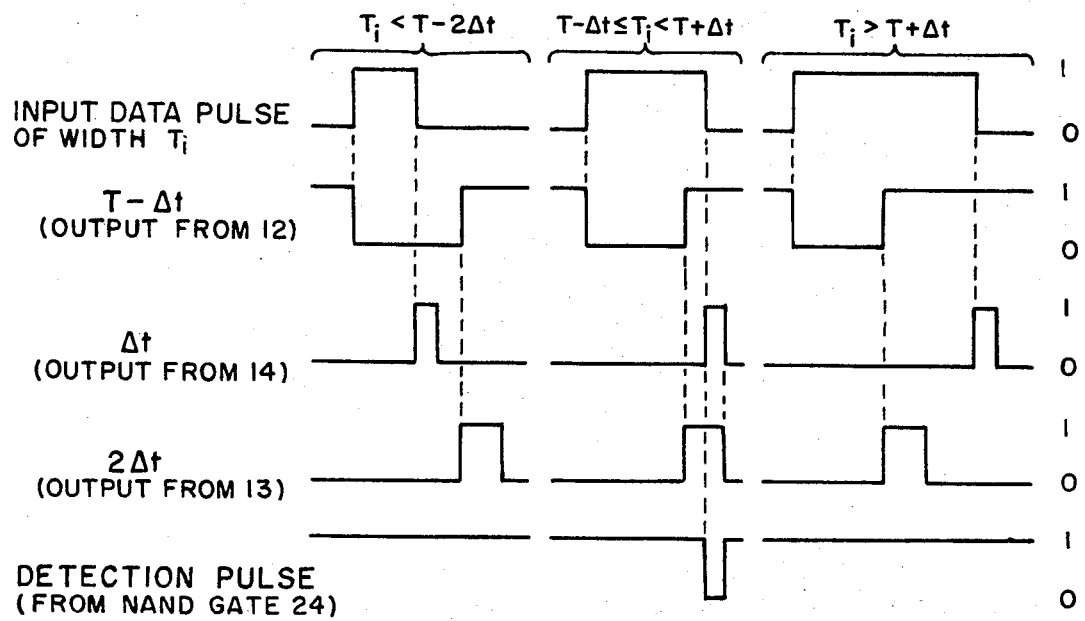
FIG. 2 is a timing diagram depicting the cases wherein the input pulse of width T is less than, equal to, and greater than the specified tolerance.

With reference to FIG. 2, the operation of FIG. 1 can best be seen when considering the cases in which a particular input pulse $T_i$ is less than, equal to, or greater than the required pulse length T plus or minus the required tolerance $\Delta t$.

Considering the case where input pulse $T_i$ is less than $T - \Delta t$, for example where $T_i < T - 2\Delta t$, reference should be made to FIG. 2. Input pulse of a width $T_i$ is presented as INPUT DATA PULSE. The leading edge of this pulse triggers a pulse of width $T - \Delta t$, the trailing edge of the input pulse triggers a pulse of width $\Delta t$. At the end of the $T - \Delta t$ pulse, another pulse of a width equal to $2\Delta t$ is generated. However, since the pulse of width $\Delta t$, generated by the trailing edge of the input pulse, is not coincident with any part of the $2\Delta t$ pulse, no detection pulse is generated from the output of NAND gate 24. As the input pulse width increases beyond $T - 2\Delta t$, some part of the pulse generated by the trailing edge of the input pulse is coincident with the $2\Delta t$ pulse. A detection pulse, whose width increases as $T_i$ approaches $T - \Delta t$, is generated but its leading edge is not coincident with the trailing edge of $t$. input pulse until $T_i \geq T - \Delta t$.

If the input pulse width is $T - \Delta t \leq T_i < T + \Delta t$ as shown in FIG. 2, a negative-going pulse is generated by NAND gate 24 since the $\Delta t$ pulse and the $2\Delta t$ pulse are coincident. It should be noted that this leading edge of the output pulse from NAND gate 24 is coincident with the trailing edge of the input pulse. As shown in FIG. 2, the detection pulse width is equal to $\Delta t$ but decreases towards zero as $T_i$ increases towards $T + \Delta t$.

Finally when $T_i > T + \Delta t$, as shown in FIG. 2, the pulse of width $\Delta t$ pulse and thus no detection pulse is generated.

Figure 3:
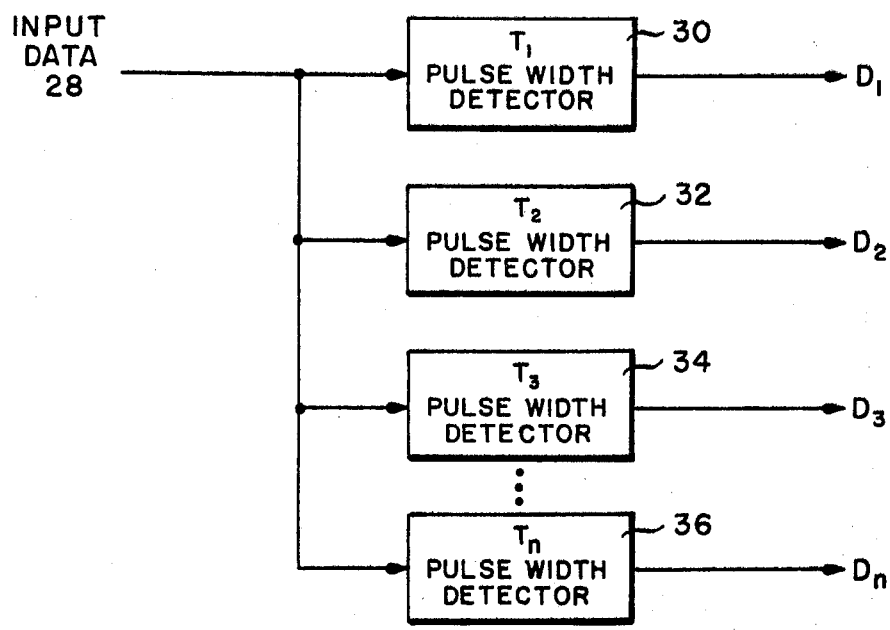
FIG. 3 is a diagram of the system for decoding pulses of N different specific widths.

Referring to FIG. 3, input data 28 in the form of sequence of pulses of various widths is applied to several pulse width detector circuits 30, 32, 34 and 36. Each circuit is adjusted to detect a pulse of particular width such as $T_1, T_2, T_3 \ldots T_N$. Each pulse-width detector circuit can have an individual tolerance. The circuits 30, 32, 34 and 36 each correspond to the entire circuitry of FIG. 1. Thus as can easily be seen from FIG. 3, when N number of pulse width detectors such as 36 are connected in a parallel manner, pulses of N different widths can be detected.

Figure 4:
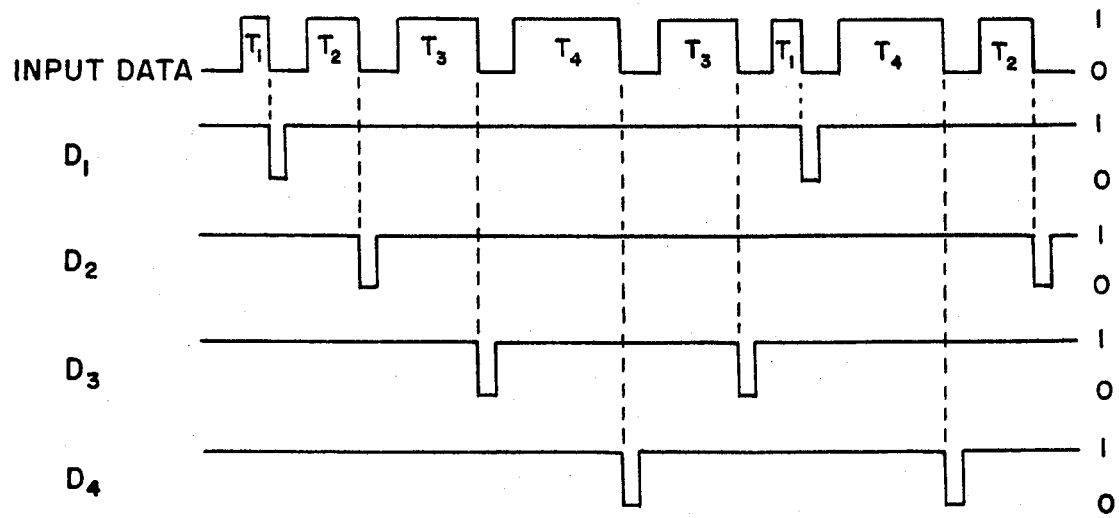
FIG. 4 is a timing diagram showing a multitude of pulses of specific length generated from the system shown in FIG. 3.

Referring to FIG. 4, input data composed of four different pulse widths $T_1, T_2, T_3$ and $T_4$ as applied to a circuit similar to FIG. 3 is shown. Outputs $D_1, D_2, D_3$ and $D_4$, respectively, correspond to the individual pulse width detectors. Each output appears at the trailing edge of a detected input pulse.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A device for detecting a pulse of a particular width falling within a specific tolerance comprising:

means for generating a first pulse of a minimum acceptable width upon reception of the leading edge of an interrogated pulse; and means coupled to said means for generating a first pulse for generating a second pulse of a width equal to twice the specific tolerance; and means for generating a third pulse upon reception of the trailing edge of said interrogated pulse;

means coupled to said means for generating a second pulse and to said means for generating a third pulse for determining if said third pulse is coincident with said second pulse, wherein a detection pulse is generated if said second and third pulses are coincident.

2. The device as claimed in claim 1 wherein said means for generating a first, second, and a third pulse is each a one shot circuit capable of producing a pulse of a preset length.

3. The device as claimed in claim 1 wherein said means for determining if said third pulse is coincident with said second pulse is a NAND gate.

* * * * *